Figure 1:
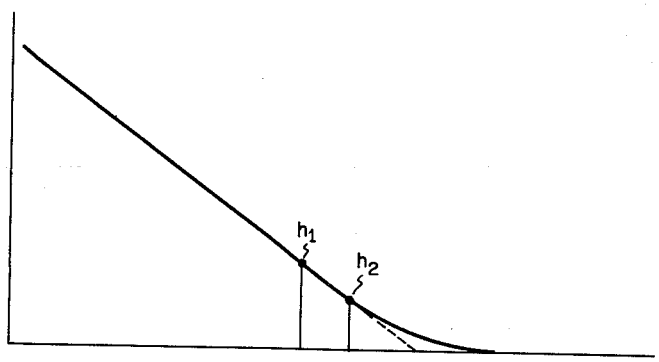

Sept. 4, 1962     M. J. MATCH ET AL     3,052,427
FLARE-OUT SYSTEM FOR AIRCRAFT
Filed July 8, 1960     2 Sheets-Sheet 1

$h_t$ — TRUE ALTITUDE
$h_c$ — COMMANDED ALTITUDE
$h_a$ — ACTUAL ALTITUDE

INVENTORS
MARVIN J. MATCH
KENNETH THOMSON
BY
ATTORNEY

Sept. 4, 1962    M. J. MATCH ET AL    3,052,427
FLARE-OUT SYSTEM FOR AIRCRAFT
Filed July 8, 1960    2 Sheets-Sheet 2

INVENTORS
MARVIN J. MATCH
KENNETH THOMSON
BY
ATTORNEY

United States Patent Office 3,052,427
Patented Sept. 4, 1962

3,052,427
FLARE-OUT SYSTEM FOR AIRCRAFT
Marvin J. Match, Roslyn, and Kenneth Thomson, Hicksville, N.Y., assignors to Sperry Rand Corporation, Great Neck, N.Y., a corporation of Delaware
Filed July 8, 1960, Ser. No. 41,528
11 Claims. (Cl. 244—77)

This invention relates generally to aircraft landing equipment, and more particularly to apparatus which guides a landing aircraft through a flare-out maneuver.

In aircraft instrument landing systems there is generally provided a radio beam glide path to define a descending path for the plane to follow in order to touch down on the runway. Conventional apparatus provides a glide path which is essentially a straight line intersecting the horizontal runway at an appreciable angle. It has been found that this straight glide path brings the plane into contact with the earth with too great a shock. Therefore, it is desirable to "flare-out" the slope of the glide path as it closely approaches the earth so that it does not intersect the runway at an angle of several degrees, but rather approaches the runway in a smooth manner resembling an asymptotic curve.

The glide path beam at low altitudes may be noisy and comparatively erratic signal-wise. Also, there is an effect experienced whereby a glide path beam will tend to bend near the earth's surface. Because of the wedge-shaped nature of the glide path beam, the course width is very narrow at low altitudes causing unstable characteristics in the control system. These and other factors render the glide path beam unsuitable for effecting control and guidance of an aircraft at low altitudes with the desired degree of accuracy for landing operations culminating in the actual touchdown of the aircraft.

Generally, apparatus embodying the present invention stores, or memorizes, a signal representing the radio-defined glide path at an altitude at which the received radio signals are reliable. The radio receiver is then disengaged and the aircraft is made to follow the memorized glide path by equating the signal representing the memorized glide path to a signal representing the actual glide path. As the aircraft descends down the glide path toward the runway, an altitude is reached at which a flare-out maneuver is commanded. The flare-out maneuver is intiated by suddenly adding to the signal representing the actual glide path, a signal representing a constant, and comparing the result of this summation with the signal representing the memorized glide path. As a result of this comparison, an error signal is produced which directs the aircraft to fly along a less steep glide path. Because of the slow response of the aircraft to change to a new glide path, a smooth transition from one path to another occurs. Apparatus embodying the invention is versatile in that it may adapt itself to the steepness of a variety of glide paths. For glide paths which are very steep, the altitudes at which the radio defined glide path is memorized and the flare-out maneuver is commenced are high so that flare accelerations commanded do not exceed aircraft stall limits. For less steep glide paths, these altitudes are lower. Also, the profile of the glide path may be changed simply by substituting a programmed set of values for the constant which is added at the flare-out altitude.

The principal object of the invention is to provide apparatus for directing an aircraft along a glide path and through a flare-out maneuver to a landing.

Another object of the invention is to provide glide path control apparatus which varies the position of a commanded glide path as a function of the aircraft displacement from a memorized glide path.

Figure 2:
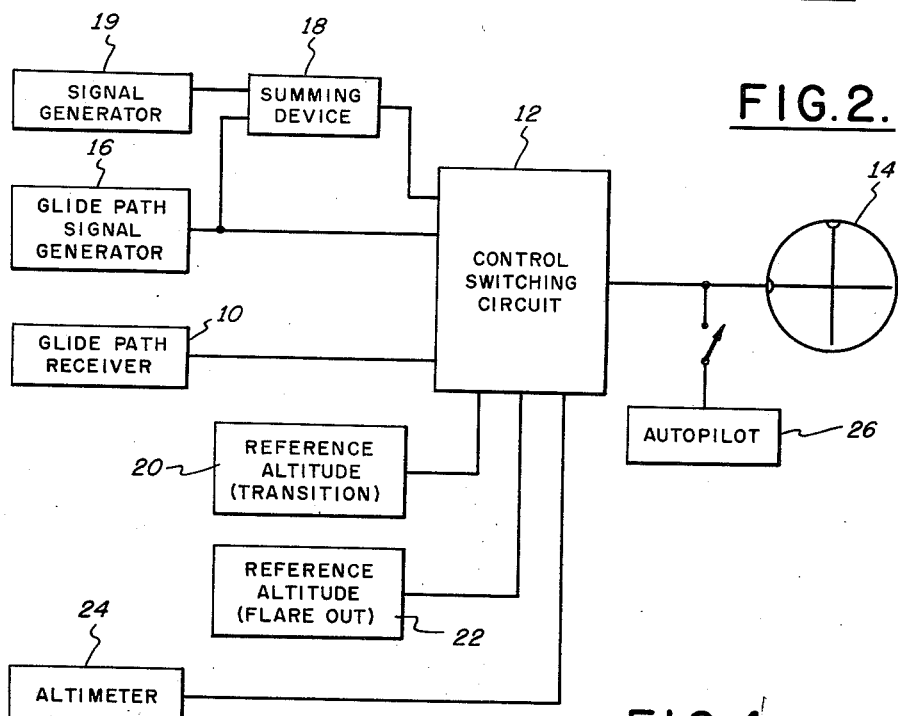
Figure 4:
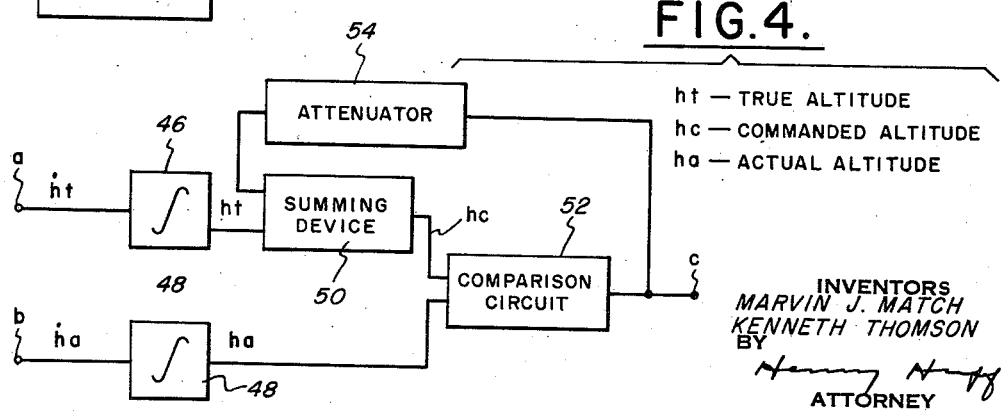
Figure 3:
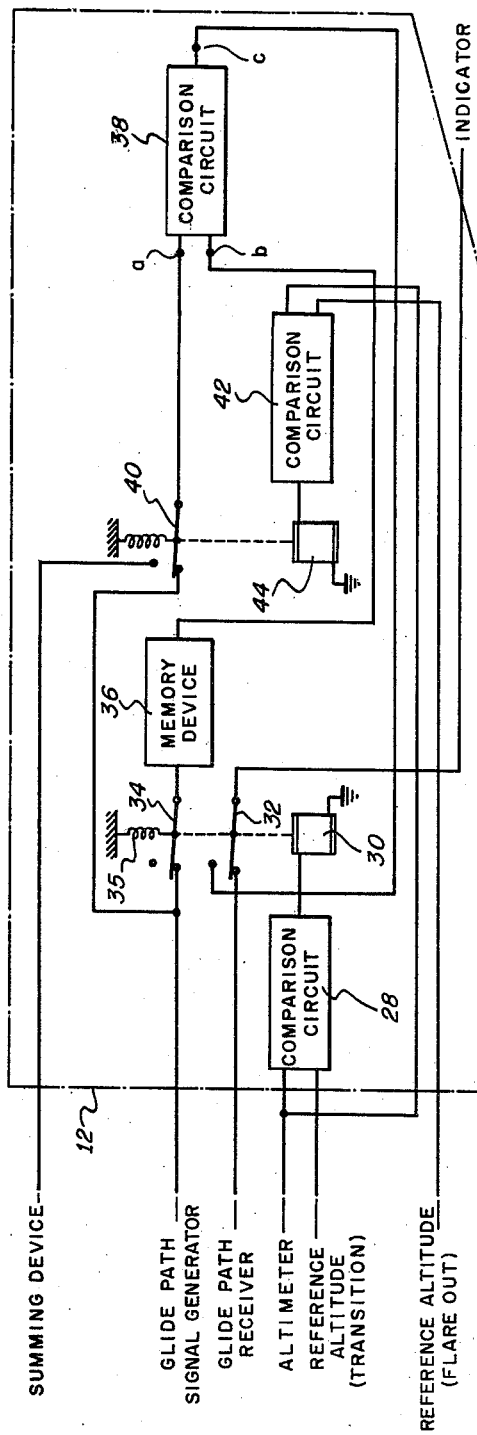
Figure 5:
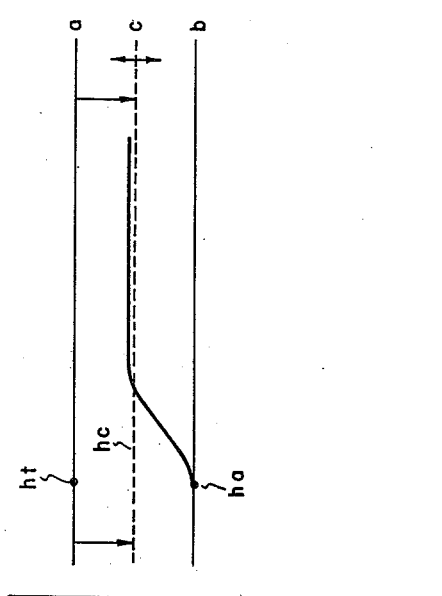

The invention will be described with reference to the figures wherein:

FIG. 1 is a diagram of a typical glide path, depicting the points at which a radio-defined glide path is memorized and a flare-out maneuver is commenced, FIG. 2 is a block diagram showing the general arrangement of components in an embodiment of the invention, FIG. 3 is a schematic diagram of a control switching circuit utilizable with the present invention, FIG. 4 is a block diagram of a circuit which, when substituted for an element of FIG. 3, causes the apparatus of FIG. 3 to direct the aircraft to fly to a glide path whose position is displaced from a memorized glide path by an amount proportional to the displacement of the aircraft from the memorized glide path, and FIG. 5 is a diagram illustrating the floatability of a commanded glide path as a function of the displacement of the aircraft from a memorized glide path.

Referring to FIGS. 1–3, a glide path receiver 10, such as an instrument landing system receiver, is connected through a control switching circuit 12 to an indicator 14. The output signal from the glide path receiver 10 is a D.C. signal representing the displacement of the aircraft from the center of a radio-defined glide path. The signal from the glide path receiver 10 operates to displace the horizontal bar of the indicator 14 an amount proportional to the displacement of the aircraft from the center of the radio beam. Therefore, the pilot can keep the craft on the radio defined glide path by maintaining the indicator bar centered. Also connected to the indicator 14 through the control switching circuit 12 is a glide path signal generator 16. The glide path signal generator 16 generates a signal representing the instantaneous glide path of the aircraft. That is, the glide path signal generator provides either a signal representing the instantaneous flight path angle of the aircraft or a signal representing the instantaneous rate of descent of the aircraft. A signal representing the aircraft flight path angle may be provided by the apparatus disclosed in U.S. Patent 2,896,145, issued to R. Snodgrass, and assigned to the assignee of the present invention. The signal representing the aircraft rate of descent may be provided by apparatus such as the combination of elements 1 and 5 of U. S. Patent 2,841,345, issued to P. Halpert et al., and assigned to the assignee of the instant invention. Connected to receive the output signal from the glide path signal generator 16 is a summing device 18 which also has a signal representing a constant $k$ applied to it from the signal generator 19. The output signal from the summing device is applied, through the control switching circuit 12, to the indicator 14. Signals representing the altiutdes at which the radio-defined glide path is to be memorized and the flare-out maneuver is to be commenced, are respectively provided by the references 20 and 22 which may, simply, be separate sources of reference potential. These reference signals are sequentially compared in the control switching circuit 12 with an output signal from an altimeter 24 which is, preferably, a high accuracy radio altimeter. The elevation channel of the autopilot 26 may be connected to receive the output signal from the control switching circuit 12.

Referring to FIG. 3, the control switching circuit 12 has a signal representing the aircraft altitude applied from the altimeter 24 to a comparison circuit 28 together with the signal from the reference 20, representing the altitude at which the radio-defined glide path is to be memorized. The comparison circuit 28 operates to supply an output signal only when the altimeter signal is greater than the signal supplied by the reference 20. A relay 30 is connected to receive the output signal from the comparison circuit 28. The comparison circuit 28, in its simplest form, is a diode which is connected in series with the relay 30 and which is back-biased by the signal from the reference 20. This form of comparator is described and shown on page 460, FIG. 15–1, Pulse and Digital Circuits, by Jacob Millman and Herbert Taub, McGraw-Hill Publishing Co., 1956. When a signal is applied to the relay 30, switches 32 and 34 are held in their lower positions. However, at the altitude at which the comparison circuit 28 ceases to produce an output, i.e. at the transition altitude, the relay 30 is deenergized, releasing the switches 32 and 34 to their upper positions through the action of the spring 35. Prior to the movement of the switches 32 and 34 to their upper positions, the glide path receiver 10 is connected through the switch 32 to the indicator 14. The glide path receiver, therefore, controls the flight of the aircraft along the glide path above the transition altitude. Also above the transition altitude, the glide path signal generator, i.e. the flight path angle computer or the rate of descent computer, is connected through the switch 34 to a memory device 36. The memory device 36 may, in its simplest form, be a capacitor. The output signal from the memory device 36 is applied to a comparison circuit 38, of a type similar to element 6 of Patent 2,841,345. The glide path signal generator 16 is also connected through a switch 40 to the comparison circuit 38 wherein it is compared with the memorized glide path signal. Since the memorized and actual glide path signals are the same when switches 34 and 40 are in their lower positions, i.e. when the craft is above the transition altitude, the comparator 38 has no output signal at that time. However, when the switch 34 is in its upper position, the comparison circuit 38 has an output signal whenever the memorized and instantaneous glide path signals are different, that output signal being applied to the indicator 14. As the aircraft descends down the glide path, the altitude (approximately 40 feet) is reached at which the signal from the altimeter 24 and the signal from the reference 22 are equal. These signals are both applied to a comparison circuit 42. The comparison circuit 42 is similar to the comparison circuit 28 and provides an output signal whenever the signal from the altimeter 24 is greater than the signal from the reference 22. The output signal from the comparison circuit 42 is applied to the relay 44 which operates similarly to the relay 30. When the switch 40 is in its upper position, the output signal from the summing device 18 is applied to the comparison circuit 38 instead of the output signal from the glide path signal generator 16. That is, a signal representing the memorized glide path is compared, not with a signal representing the instantaneous glide path, but utilizing a signal representing the instantaneous glide path plus a constant $k$.

In operation, the aircraft is guided along a radio-defined glide path by a glide path receiver 10. As the aircraft departs from the defined glide path, an error signal is generated by the receiver 10 which is applied through the switch 32 to the indicator 14 to move the horizontal bar of the indicator an amount proportional to the displacement. The aircraft is then brought back onto the defined glide path by a pilot or by the autopilot 26. As the aircraft descends, the altitude ($h_1$, FIG. 1), at which the altimeter 24 signal and the reference 20 signal are equal, is reached. At this point, the comparison circuit 28 ceases to supply an output signal to the relay 30, thereby releasing the switches 32 and 34 to their upper positions. The memory device 36, as a result of the opening of the switch 34, has stored therein a signal representing the glide path of the aircraft at the point of transition from glide path receiver control. The memorized glide path signal is then compared with the signal representing the instantaneous glide path so as to maintain the descent of the aircraft along a path which is coincidental with the radio-defined path. As the aircraft further descends along the glide path (between altitudes $h_1$ and $h_2$, FIG. 1) the altimeter 24 applies a signal to the comparison circuit 42. A signal representing the altitude at which the flare-out is initiated is also applied to the comparison circuit 42 by the reference 22. At altitude $h_2$, the altimeter 24 signal equals the reference 22 signal and the comparison circuit 42 ceases to apply a signal to the relay 44. Switch 40 is then moved to its upper position so that the output signal from the summing device 18 may be compared with the memorized glide path signal. At the instant switch 40 moves to its upper position, the comparison circuit 38 applies an output signal which displaces the horizontal bar of the indicator 14 by an amount proportional to the constant $k$. The pilot or autopilot 26 then operates to cancel out this error signal and, in so doing, flies the aircraft through a flare-out maneuver.

The apparatus of FIGS. 2 and 3 causes the descending aircraft to fly along a glide path which makes a particular angle with the surface of the earth. Forces causing the aircraft to depart from the selected glide path are cancelled out whenever the aircraft flies parallel to that path, i.e. when the aircraft flies along a path which makes the same angle with the surface of the earth as the selected glide path. Because the aircraft is permitted to fly along any number of paths which are parallel to the selected glide path, the point at which the aircraft touches down onto the runway may float between early and late touchdown points depending on the amount the craft is displaced from the selected glide path. Both the comparison of a memorized flight path angle with an instantaneous flight path angle and the comparison of a memorized rate of descent with an instantaneous rate of descent result in this floating touchdown point condition. This condition may, however, be obviated simply by integrating a signal representing the memorized rate of descent and integrating a signal representing the instantaneous rate of descent. Such integrations produce respectively signals representing a commanded altitude and an instantaneous altitude. These altitude signals are then compared in a comparator (such as the comparison circuit 38), the output of which is utilized to cause the aircraft to return to the commanded altitude whenever the aircraft departs from the selected glide path. Hence, the aircraft is made to fly effectively on a fixed, selected glide path.

When the aircraft, while flying in a fixed glide path mode, is subjected to large, short duration forces on its control surfaces, e.g. wind gusts, it is caused to make sharp up and down maneuvers to get back to the commanded altitude. While this condition is permissible at higher altitudes, it is dangerous to have the aircraft make sharp nose-up and nose-down maneuvers in close proximity to the ground.

For this reason, the apparatus of FIG. 4 is provided and is, in a preferred form of this invention, substituted for the comparison circuit 38 of FIG. 3. The apparatus of FIG. 4, when substituted for the comparison circuit 38, permits the glide path which is actually commanded to float away from the memorized glide path (called the true glide path) toward the actual glide path by an amount proportional to the aircraft departure from the true glide path. However, the commanded glide path is permitted to eventually float back to coincide with the true glide path. A sharp departure of the aircraft from the true glide path therefore results in a gradual return of the aircraft to the true glide path.

In substituting the circuit of FIG. 4 for the comparison circuit 38, connection of the circuit of FIG. 4 is made to terminals $a$, $b$ and $c$, as shown. The circuit of FIG. 4 is provided with integrators 46 and 48, which respectively integrate signals representing the true, or memorized rate of descent, and the actual rate of descent of the aircraft. A signal representing the altitude at which the craft should be, appears at the output of the integrator 46 and is applied to a summing device 50. A comparison circuit 52, similar to comparison circuit 38, receives a signal representing the actual aircraft altitude from the integrator 48 together with the output signal from the summing device 50. The comparison circuit 52 output signal is applied via terminal c to the indicator 14 and also to an attenuator 54. The output signal from the attenuator 54 is applied to the summing device 50 wherein it is algebraically added to the true, or memorized, altitude signal.

The operation of the circuit of FIG. 4 is best described in a hypothetical situation wherein there is no true altitude rate signal: that is, in a situation in which the aircraft is flying parallel to the earth. At a particular moment, with the actual aircraft altitude $h_a$ at a value which is less than the true altitude $h_t$ (see FIG. 5), the output signal from the comparison circuit 52 directs the aircraft to perform a fly-up maneuver. However, at the same instant, the fly-up signal is fed back in attenuated form to the summing device 50 which operates to produce a lowered commanded altitude. Hence, the commanded altitude floats down toward the actual altitude so as to provide a less sharp fly-up command. As the aircraft climbs to the floating commanded altitude, the output from the comparison circuit 52 becomes less, with the result that the signal which is fed back to the summing device 50 is also smaller. The output signal from the summing device 50 is thereby increased, with the net result that the commanded altitude is floated higher and closer to the true altitude. This operation is continued, with the commanded altitude gradually rising to coincide with the true altitude. With the true altitude changing because of the presence of an altitude rate signal, e.g. during a landing approach, the operation of the apparatus of FIG. 4 is unchanged.

Substitution of the apparatus of FIG. 4 for the comparison circuit 38 does not effect the general operation of the apparatus of FIGS. 2 and 3, but merely determines the degree that the actual glide path approaches coincidence with the true glide path.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for guiding an aircraft to a landing comprising means storing a signal representing a commanded glide path, means producing a signal representing the glide path of said aircraft, differential means receiving said commanded and aircraft glide path signals to produce a difference signal for controlling the vertical flight of said aircraft above a predetermined altitude, said aircraft glide path signal being such that said difference signal varies linearly when said aircraft departs linearly from the commanded glide path, and means responsive below said predetermined altitude to add algebraically to one of said glide path signals a signal representing a constant, whereby said means producing a difference signal produces a signal representing the difference between said signal representing the sum of said glide path and constant signals and said other glide path signal.

2. Apparatus of claim 1 including means providing said commanded glide path signal, said means comprising means directing said aircraft along a radio defined course and means storing a signal representing the glide path of said aircraft at a second higher predetermined altitude, the glide path, as represented by the stored signal, being the commanded glide path.

3. Apparatus for guiding an aircraft to a landing comprising means providing a signal representing the glide path of said aircraft, means providing a signal representing a standard glide path, means receiving both glide path signals and producing a signal representing the difference between said signals, said difference signal being utilizable for controlling the vertical flight of said aircraft above a predetermined altitude, said aircraft glide path being such that said difference signal varies linerly when said aircraft departs linearly from the standard glide path, means adding to one of said glide path signals a signal representing a constant, said signal representing said constant being added only below the predetermined altitude, and means receiving said signal representing the sum of said glide path signal and said constant signal together with the other of said glide path signals to produce a signal representing the difference between the signals applied to it, said last mentioned difference signal being utilizable for controlling the flight of said aircraft below said predetermined altitude.

4. Apparatus for providing the proper landing approach for an aircraft comprising means for guiding said aircraft down to a predetermined altitude, means producing a signal representing the glide path of said aircraft, means storing a signal representing the glide path of the aircraft at the predetermined altitude, means comparing said stored glide path signal with the actual aircraft glide path signal to produce a signal representing the difference between said glide path signals, said difference signal being utilizable to control the vertical flight of the aircraft below the predetermined altitude, said aircraft glide path signal being such that said difference signal varies linearly when said aircraft departs linearly from the glide path it had at the predetermined altitude, and means responsive below a second lower predetermined altitude to algebraically add to one of said glide path signals a signal representing a constant, said means producing a difference signal producing a signal representing the difference between said signal representing the addition of said constant and glide path signals and said other glide path signal for controlling the flight of said aircraft below said second predetermined altitude.

5. Apparatus for guiding an aircraft to a landing comprising means guiding said aircraft to a predetermined altitude, means storing a signal representing the aircraft glide path at said altitude, means producing a signal representing the glide path of said aircraft, means producing a signal representing a constant, means adapted to receive said glide path, stored, and constant signals and produce a signal below said predetermined altitude representing the algebraic sum of said stored and glide path signals for controlling the vertical flight of said aircraft below that altitude, said last named algebraic sum signal varying linearly when said aircraft departs linearly from the glide path it had at the predetermined altitude, said means adapted to receive the glide path, stored and constant signals also producing below a second lower predetermined altitude, a signal representing the algebraic sum of said glide path, stored, and constant signals for controlling the vertical flight of said aircraft below the second predetermined altitude.

6. Apparatus for guiding an aircraft to a landing comprising means storing a signal representing a commanded flight path angle, means producing a signal representing the flight path angle of said aircraft, differential means receiving said commanded and aircraft flight path angle signals to produce a difference signal for controlling the vertical flight of said aircraft above a predetermined altitude, and means responsive below said predetermined altitude to add algebraically to one of said flight path angles signals a signal representing a constant, whereby said means producing a difference signal produces a signal representing the difference between said signal representing the sum of said flight path and constant signals and said other flight path signal.

7. Apparatus for guiding an aircraft to a landing comprising means guiding an aircraft to a first predetermined altitude, means storing a signal representing the rate of descent at said predetermined altitude, means producing a signal representing the aircraft rate of descent, means adapted to receive said stored and aircraft rate of descent signals and produce a signal representing the difference between those signals, said difference signal controlling the vertical flight of said aircraft below said first predetermined altitude but above a second predetermined altitude, said aircraft glide path signal being such that said difference signal varies linearly when said aircraft departs linearly from the glide path it had at the predetermined altitude, means adding below said second predetermined altitude to one of said rate of descent signals a signal representing a constant, whereby the vertical flight of said aircraft is controlled by a signal representing the difference between the sum of the constant and descent rate signals and the other descent rate signal.

8. Apparatus for guiding an aircraft to a landing comprising means producing a signal representing a commanded altitude which gets progressively lower with time, means producing a signal representing the altitude of said aircraft, means adapted to receive said altitude signals and produce a signal representing the difference between said signals, said difference signal being utilizable for controlling the vertical flight of said aircraft, means adding, below the predetermined altitude, to one of said altitude signals, a signal representing a constant, whereby said means producing a difference signal produces below said predetermined altitude a difference signal representing the difference between the sum of one altitude signal and the constant signal and the other altitude signal.

9. Apparatus for guiding an aircraft along a particular path comprising means generating a signal representing that path, means generating a signal representing the actual path of said aircraft, attenuating means, comparison means, the output signal of which is applied to said attenuating means, and summing means algebraically adding said signal from said attenuating means and one of said path signals, said sum signal being applied together with said other path signal to said comparison means to produce a signal for changing the path of said aircraft.

10. Apparatus for guiding an aircraft to a landing comprising means generating a signal representing a diminishing commanded altitude, means generating a signal representing the actual altitude of said aircraft, comparison means, the output signal of which operates to change the vertical flight of the aircraft, attenuating means also receiving said comparison means output signal, means coupled to produce the algebraic sum of said attenuating means output signal and one of said altitude signals, said means producing said sum signal being coupled to said comparison means along with said means generating the other of said altitude signals, whereby said comparison means produces a signal representing their difference.

11. Apparatus for guiding an aircraft to a landing comprising means generating a signal representing a diminishing commanded altitude, means generating a signal which represents the altitude of said aircraft, comparison means, attenuating means receiving said comparison means output signal, means receiving one of said altitude signals and the output signal from said attenuating means and producing a signal representing the sum of its input signals, said sum signal and said other altitude signal being applied to said comparison means wherein they are compared with each other, and means algebraically adding to one of said altitude signals below a predetermined altitude a signal representing a constant, the output signal for said comparison means being utilizable to control the vertical flight of said aircraft.

References Cited in the file of this patent

UNITED STATES PATENTS

| | | |
|---|---|---|
| 2,830,291 | Hecht | Apr. 8, 1958 |
| 2,841,345 | Halpert | July 1, 1958 |
| 2,948,494 | Curry | Aug. 9, 1960 |
| 2,987,275 | Moncrieff-Yeates | June 6, 1961 |